United States Patent
Weil et al.

(10) Patent No.: US 7,794,170 B2
(45) Date of Patent: Sep. 14, 2010

(54) JOINT WITH APPLICATION IN ELECTROCHEMICAL DEVICES

(75) Inventors: K. Scott Weil, Richland, WA (US); John S. Hardy, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 949 days.

(21) Appl. No.: 11/112,122

(22) Filed: Apr. 22, 2005

(65) Prior Publication Data

US 2006/0239765 A1    Oct. 26, 2006

(51) Int. Cl.
*F16B 7/10* (2006.01)
*H01M 10/44* (2006.01)

(52) U.S. Cl. .......................... 403/50; 429/57
(58) Field of Classification Search ............ 403/50, 403/501; 228/122.1, 245, 256; 429/57
See application file for complete search history.

(56) References Cited

U.S. PATENT DOCUMENTS 6,430,966 B1 * 8/2002 Meinhardt et al. ............. 65/43

2003/0132270 A1   7/2003  Weil et al.
2004/0060967 A1 * 4/2004  Yang et al. ............... 228/122.1

FOREIGN PATENT DOCUMENTS

JP         09 067672       3/1997

* cited by examiner

*Primary Examiner*—Jennifer Michener
*Assistant Examiner*—Monique Wills
(74) *Attorney, Agent, or Firm*—Douglas E. McKinley, Jr.

(57) ABSTRACT

A joint for use in electrochemical devices, such as solid oxide fuel cells (SOFCs), oxygen separators, and hydrogen separators, that will maintain a hermetic seal at operating temperatures of greater than 600° C., despite repeated thermal cycling excess of 600° C. in a hostile operating environment where one side of the joint is continuously exposed to an oxidizing atmosphere and the other side is continuously exposed to a wet reducing gas. The joint is formed of a metal part, a ceramic part, and a flexible gasket. The flexible gasket is metal, but is thinner and more flexible than the metal part. As the joint is heated and cooled, the flexible gasket is configured to flex in response to changes in the relative size of the metal part and the ceramic part brought about by differences in the coefficient of thermal expansion of the metal part and the ceramic part, such that substantially all of the tension created by the differences in the expansion and contraction of the ceramic and metal parts is absorbed and dissipated by flexing the flexible gasket.

16 Claims, 4 Drawing Sheets

JOINT WITH APPLICATION IN ELECTROCHEMICAL DEVICES

The invention was made with Government support under Contract DE-AC05-76RL01830, awarded by the U.S. Department of Energy. The Government has certain rights in the invention.

RELATED APPLICATIONS

This application claims priority to U.S. Provisional Application No. 60/566045, the entire contents of which are incorporated herein by this reference.

TECHNICAL FIELD

This invention relates to electrochemical devices, including, without limitation, solid oxide fuel cells, oxygen separators, and hydrogen separators. More specifically, the present invention relates to improved joints utilized in electrochemical devices, and methods of forming those joints.

BACKGROUND OF THE INVENTION

Those skilled in the art of electrochemical devices, including without limitation, solid oxide fuel cells, oxygen separators, and hydrogen separators, recognize a need for improved seals at the interface between ceramic and metal parts utilized in these devices. For example, among solid oxide fuel cell designs, the planar stack (pSOFC) has received growing attention because its compact nature affords high volumetric power density—a design feature of particular importance in transportation applications. With the advent of anode-supported cells that employ thin YSZ electrolytes, these devices can be operated at reduced temperature (700-800° C.) and still achieve the same current densities exhibited by their high-temperature, thick electrolyte-supported counterparts, as described in B. C. H. Steele, A. Heinzel (2001) Materials for fuel-cell technologies, *Nature*, 414(X) 345-52. The entire contents of this, and each and every other patent, paper or other publication referenced herein is hereby incorporated into this disclosure in its entirety by this reference. The lower operating temperature not only makes it possible to consider inexpensive, commercially available high temperature alloys for use in the stack and balance of plant, but also expands the range of materials that can be considered for device sealing.

Because SOFCs function under an oxygen ion gradient that develops across the electrolyte, hermiticity across this membrane is paramount. In a planar design, this means that the YSZ layer must be dense, must not contain interconnected porosity, and must be connected to the rest of the device with a high temperature, gas-tight seal of the type shown in FIG. 1. One of the fundamental challenges in fabricating pSOFCs is how to effectively seal the thin electrochemically active YSZ membrane against the metallic body of the device creating a hermetic, rugged and stable stack. Typical conditions under which these devices are expected to operate and to which the accompanying YSZ-to-metal seal will be exposed include: (1) an average operating temperature of 750° C.; (2) continuous exposure to an oxidizing atmosphere on the cathode side and a wet reducing gas on the anode side; and (3) an anticipated device lifetime of 10,000+ hours.

Two techniques are typically used by those skilled in the art to seal a planar stack; glass joining and compressive sealing. Inherent advantages and limitations are found with each method. For example, glass joining is a cost-effective and relatively simple method of bonding ceramic to metal. However, the final seal is typically brittle and non-yielding, making it particularly susceptible to fracture when exposed to tensile stresses such as those encountered during non-equilibrium thermal events or due to thermal expansion mismatches between the glass and joining substrates as described in K. Eichler, G. Solow, P. Otschik, W. Schaffrath (1999) BAS ($BaO.Al_2O_3.SiO_2$) glasses for high temperature applications, *J. Eur. Cer. Soc.*, 19(6-7) 1101-4 and Z. G. Yang, K. S. Weil, D. M. Paxton, K. D. Meinhardt, J. W. Stevenson (2003) Considerations of glass sealing solid oxide fuel cell stacks, in: J. E. Indacochea, J. N. DuPont, T. J. Lienert, W. Tillmann, N. Sobczak, W. F. Gale, M. Singh (Eds.) Joining of Advanced and Specialty Materials V, ASM International, Materials Park, Ohio, 40-48.

In addition, as the initial glass seal begins to devitrify during the first few hours of high-temperature exposure, its engineered thermal expansion properties change significantly, ultimately limiting the number of thermal cycles and the rate of cycling that the stack is capable of surviving. Over time additional problems arise as the sealing material, typically barium aluminosilicate-based, reacts with the chromium- or aluminum oxide scale on the faying surface of the interconnect and forms a mechanically weak barium chromate or celsian phase along this interface as described in Z. G. Yang, K. S. Weil, K. D. Meinhardt, J. W. Stevenson, D. M. Paxton, G.-G. Xia, D.-S. Kim (2002) Chemical compatibility of barium-calcium-aluminosilicate base sealing glasses with heat resistant alloys, in: J. E. Indacochea, J. N. DuPont, T. J. Lienert, W. Tillmann, N. Sobczak, W. F. Gale, M. Singh (Eds.) Joining of Advanced and Specialty Materials V, ASM International, Materials Park, Ohio, 116-24.

In compressive sealing, a compliant, high-temperature material is captured between the two sealing surfaces and compressed, using a load frame external to the stack. Because the sealing material conforms to the adjacent surfaces and is under constant compression during use, it forms a dynamic seal. That is, the sealing surfaces can slide past one another without disrupting the hermeticity of the seal and coefficient of thermal expansion (CTE) matching is not required between the ceramic cell and metallic separator. Unfortunately, this technology remains incomplete due to the lack of a reliable high-temperature sealing material that would form the basis of the compressive seal. A number of materials have been considered, including mica, nickel, and copper, but each has been found deficient for any number of reasons, ranging from oxidation resistance in the case of the metals to poor hermeticity and through-seal leakage with respect to the mica as described in S. P. Simner, J. W. Stevenson (2001) Compressive mica seals for SOFC applications, *J. Power Sources*, 102 (1-2) 310-6.

An additional difficulty is in designing the load frame, as it must be capable of delivering moderate-to-high loads in a high-temperature, oxidizing environment over the entire period of stack operation. Material oxidation and load relaxation due to creep, as well as added expense and additional thermal mass are all issues of concern with this seal design.

The inventors of the present disclosure recently developed an alternative method of ceramic-to-metal brazing specifically for fabricating high temperature solid-state devices such as oxygen generators described in J. S. Hardy, J. Y. Kim, K. S. Weil (in press) Joining mixed conducting oxides using an air-fired electrically conductive braze, *J. Electrochem. Soc.* Vol. 151, No. 8, pp. j43-j49 and U.S. patent application Ser. No. 10/334,346. Referred to as air brazing, the technique differs from traditional active metal brazing in two important ways: (1) it utilizes a liquid-phase oxide-noble metal melt as the basis for joining and therefore exhibits high-temperature oxidation resistance and (2) the process is conducted directly in air without the use of fluxes and/or inert cover gases. In fact, the strength of the bond formed during air brazing relies on the formation of a thin, adherent oxide scale on the metal substrate. The technique employs a molten oxide that is at least partially soluble in a noble metal solvent to pre-wet the oxide faying surfaces, forming a new surface that the remaining molten filler material easily wets. A number of metal oxide-noble metal systems are suitable, including Ag—CuO, Ag—$V_2O_5$, and Pt—$Nb_2O_5$ as described in Z. B. Shao, K. R. Liu, L. Q. Liu, H. K. Liu, S. Dou (1993) Equilibrium phase diagrams in the systems PbO—Ag and CuO—Ag, *J. Am. Cer. Soc.*, 76 (10) 2663-4, A. M. Meier, P. R. Chidambaram, G. R. Edwards (1995) A comparison of the wettability of copper-copper oxide and silver-copper oxide on polycrystalline alumina, *J. Mater. Sci.*, 30 (19) 4781-6, and R. S. Roth, J. R. Dennis, H. F. McMurdie, eds. (1987) *Phase Diagrams for Ceramists, Volume VI*, The American Ceramic Society, Westerville, Ohio.

While advances in sealing techniques such as the brazing technique described above have improved the performance of ceramic to metal joints in high temperature environments typical of electrochemical devices such as solid oxide fuel cells, there still exists a need for further improvements in these joint that allow them to operate over multiple cycles while maintaining a hermetic seal between the metal and ceramic parts.

SUMMARY OF THE INVENTION

Thus, it is an object of the present invention to provide a joint between a metal and a ceramic part that will maintain a hermetic seal at operating temperatures of greater than 600° C. It is a further object of the present invention to provide a joint between a metal and a ceramic part that will maintain a hermetic seal despite repeated thermal cycling in excess of 600° C. It is a further object of the present invention to provide a joint between a metal and a ceramic part that will maintain a hermetic seal in a hostile operating environment, such as an opeting environment where one side of the joint is continuously exposed to an oxidizing atmosphere and the other side is continuously exposed to a wet reducing gas. It is a further object of the present invention to provide a joint between a metal and a ceramic part that will maintain a hermetic seal for a lifetime of 10,000+ hours of operation.

These and other objects of the present invention are accomplished by providing a joint as shown in FIG. 2. The joint of the present invention is formed of a metal part 1, a ceramic part 2, and a flexible gasket 3. One side of the flexible gasket 3 is attached to the metal part 1 to form a hermetic seal between the two. The other side of the flexible gasket 3 is bonded to the ceramic part 2 to form a separate hermetic seal between the flexible gasket 3 and the ceramic part 2. The flexible gasket 3 is made of metal, preferably the a high temperature oxidation resistant metal with a coefficient of thermal expansion between that of metal part 1 and ceramic part 2. However, the flexible gasket 3 is thinner and more flexible than the metal part 1. As the joint is heated and cooled, differences in the material's coefficient of thermal expansion cause the ceramic part 2 and metal part 1 to expand and contract at different rates. The flexible gasket 3 is thus configured to flex in response to these changes in temperature, up to and including changes in temperature in excess of 600° C. while maintaining a hermetic seal between the ceramic part 2 and the flexible gasket 3, and between the metal part 1 and the flexible gasket 3.

Preferably, the flexible gasket 3 has greater flexibility than the metal part 1. One reason the joint is able to maintain a hermetic seal with the metal part 1 and the ceramic part 2 is because the increased flexibility in the flexible gasket 3 causes substantially all of the tension created by the differences in the expansion and contraction of the ceramic 2 and metal parts 1 to be absorbed and dissipated by flexing the flexible gasket 3.

The joint of the present invention preferably utilizes bonds between the ceramic part 2 and the flexible gasket 3 formed of brazed silver copper oxide alloys in air. Suitable bonds may also be formed by thin films of suitable glasses, such as those disclosed in U.S. Pat. No. 6,430,966, and polymeric pre-ceramic precursor such as those disclosed in C. A. Lewinsohn and S. Elangovan, Ceramic Engineering and Science Proc. Vol. 24, American Ceramic Soc., p. 317, (2003). The bond between the flexible gasket 3 and the metal part 1 may also be formed of brazed silver copper oxide alloys in air. Alternatively, any means conventionally used to bond metal parts, such as welding, may be utilized.

The joint of the present invention finds particular utility in applications including, but not limited to, electrochemical devices such as solid oxide fuel cells (SOFCs), oxygen separators, and hydrogen separators. In these and other application, it may be preferred that the ceramic part 2 is an electrolyte. For example, when utilized in certain SOFCs, it is preferred that the ceramic be an electrolyte formed of yttria stabilized zirconia (YSZ). In these and other applications, it is preferred that the flexible gasket 3 be formed of a high temperature stainless steel, thus allowing more flexibility in choosing the alloy for metal part 1. Depending on the specific application, the stainless steel used for the flexible gasket 3 may be an alumina forming stainless steel, a chromia forming stainless steel, or a superalloy, and the metal part 1 may be an alumina forming stainless steel, a chromia forming stainless steel, or a superalloy.

The configuration of devices such as SOFCs, oxygen separators, and hydrogen separators, as well as the use of alumina forming stainless steels, chromia forming stainless steels, and superalloys are well understood by those having ordinary skill in the art. Further, those having ordinary skill in the art are well aware of the need for improved joints between the metal to ceramic joint in these devices, to improve the ability of the joint to maintain a hermetic seal across multiple thermal cycles in hostile operating environments. Accordingly, it is not necessary to recite a detailed description of the design and operation of each of these devices to allow those having ordinary skill in the art to appreciate the advantages of the present invention. With the benefit of the joint described in this disclosure, those having ordinary skill in the art will readily appreciate the advantages and configurations with which the joints of the present invention may be utilized in such devices. Accordingly, while the joints of the present invention is described in detail herein below in the context of a SOFC device, those having ordinary skill in the art will readily appreciate that the joints of the present invention present the same advantages when deployed in other electrochemical devices, and the detailed description should be recognized as exemplary in nature. While this preferred embodiment of the present invention will be shown and described, it will be apparent to those skilled in the art that many changes and modifications may be made without departing from the invention in its broader aspects. The appended claims are therefore intended to cover all such changes and modifications as fall within the true spirit and scope of the invention.

BRIEF DESCRIPTION OF THE DRAWINGS

The following detailed description of the embodiments of the invention will be more readily understood when taken in conjunction with the following drawing, wherein.

DETAILED DESCRIPTION OF THE PREFERRED EMBODIMENTS

A number of high temperature alloys were considered for use as the metal gasket in experiments conducted to demonstrate joints of the present invention. As part of this proof-of-concept study, the initial materials screening analysis focused on four key properties: high oxidation resistance, low stiffness, high ductility, and low cost. Based on these factors, a commercial alumina-forming ferritic steel was selected as the foil membrane: DuraFoil (22% Cr, 7% Al, 0.1% La+Ce, bal. Fe, manufactured by Engineered Materials Solutions, Inc. Attleboro, Mass.). The DuraFoil was supplied as 50 µm thick sheet. It was then sheared into 3 cm×3 cm samples, annealed in vacuum at 900° C. for 2 hrs, and stamped into cap-shaped washers using a die designed specifically for this purpose. The stamped foils were ultrasonically cleaned in soap and water, and then flushed with acetone to remove the lubricant from the stamping operation.

Each foil washer was bonded to a 6.2 mm thick Haynes 214 washer, with an outside diameter of 4.4 cm and an inside diameter of 1.5 cm, using BNi-2 braze tape purchased from Wall Colmonoy, Inc. Madison Heights, Mich. An alumina-scale forming nickel-based superalloy, Haynes 214 displays excellent oxidation resistance at temperatures in excess of 1000° C., but also exhibits an average CTE of 15.7 m/m·K, which is almost 50% higher than that of the anode-supported bilayer, which consists of a thick porous layer of Ni chemically bonded to a dense, nonporous YSZ membrane. (CTE=10.6 µm/m·K).

Fabrication of the specimen was completed by joining the stamped Durafoil component to the Haynes 214 using BNi-2 braze tape. A second brazing operation was conducted by air brazing the top side of the stamped foil to the YSZ side of a 25 mm diameter bilayer disc using a Ag-4 mol % CuO paste. Joining was conducted by applying a concentric 24 mm ring of braze paste to the Durafoil washer using an automated pressure-driven dispenser. After allowing the paste to dry, the bilayer was placed YSZ-side down onto the washer and dead-loaded with 25 g of weight. The assembly was heated in air at 20° C./min to 1050° C. and held at temperature for 15 min before furnace cooling to room temperature.

Thermal cycle testing was conducted by heating the specimens in air at a rate of 75° C./min to 750° C., holding at temperature for ten minutes, and cooling to ≦70° C. in forty minutes before re-heating under the same conditions. A minimum of six specimens was tested for each test condition. Microstructural analysis was conducted on polished cross-sectioned samples using a JEOL JSM-5900LV scanning electron microscope (SEM) equipped with an Oxford energy dispersive X-ray analysis (EDX) system.

Figure 1:
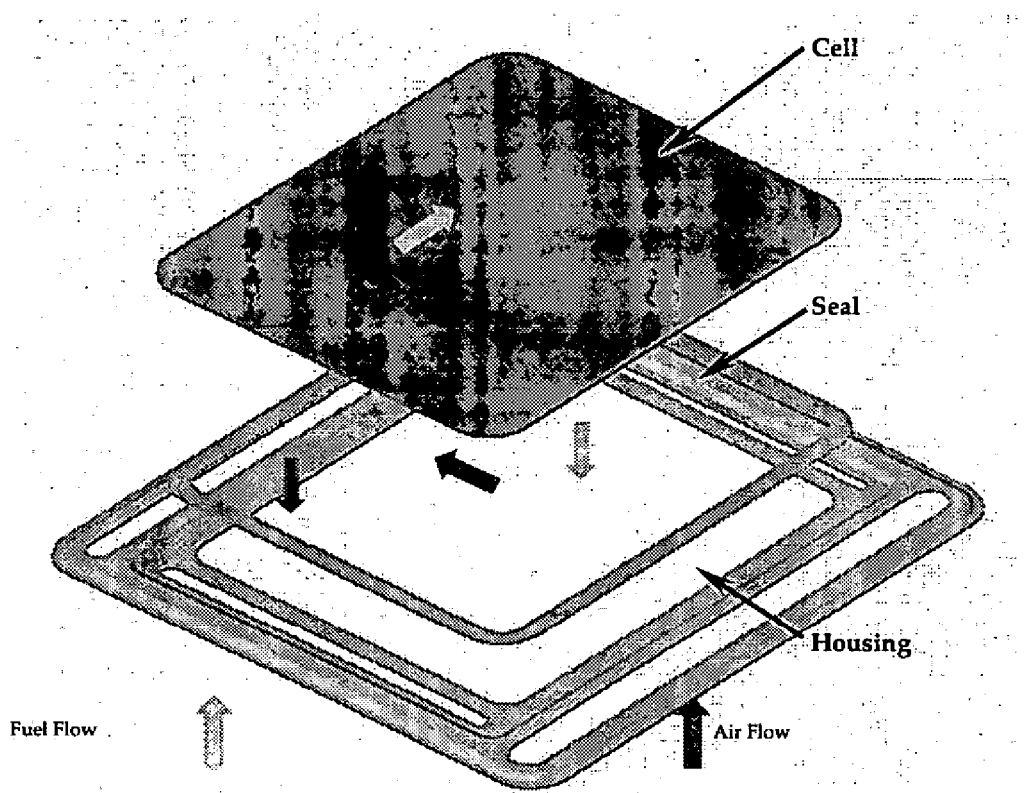
FIG. 1 is an illustration of a typical configuration of a solid oxide fuel cell used in a solid oxide fuel cell stack.
Figure 2:
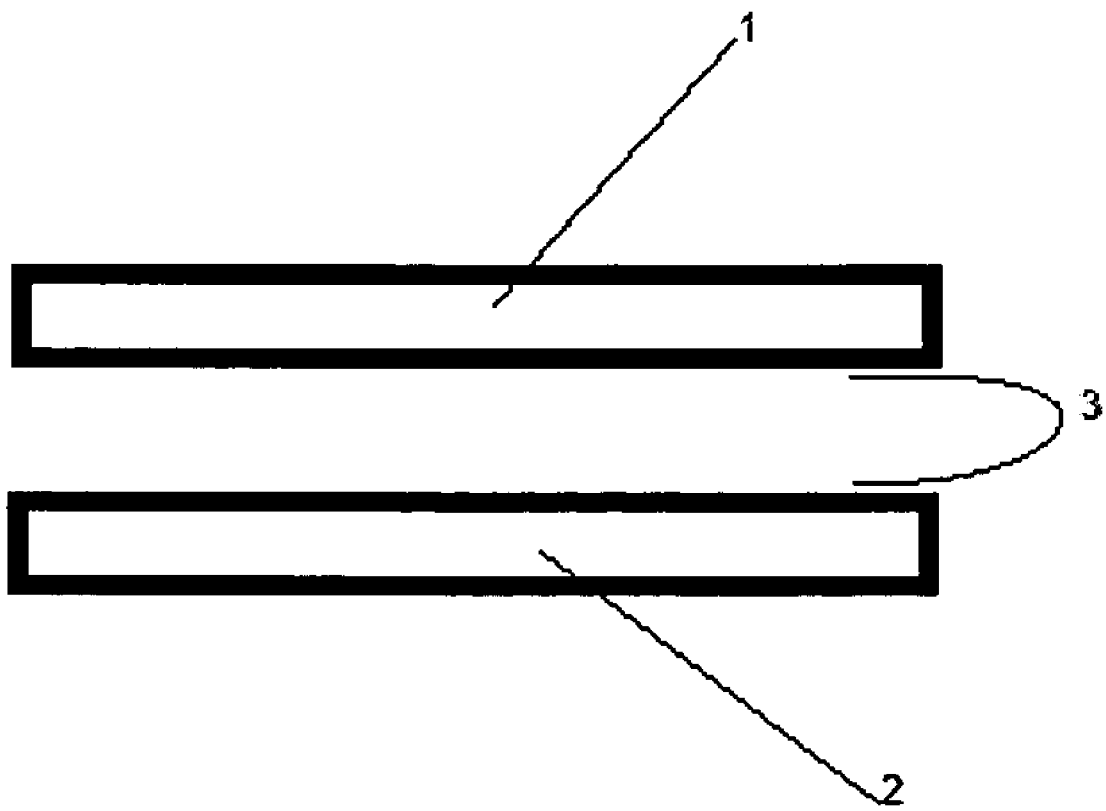
FIG. 2 is an illustration of the joint of the present invention showing the arrangement of the metal part, the ceramic part, and the flexible gasket.
Figure 3:
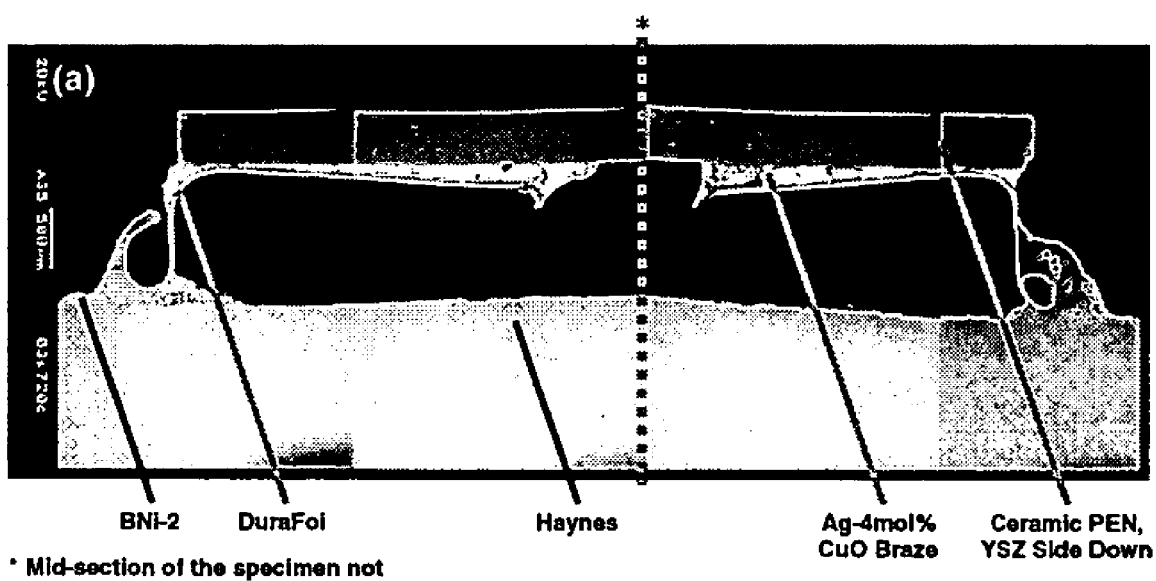
FIG. 3 is a composite cross-sectional micrograph of a joint fabricated in proof of principle experiments to demonstrate the present invention.

The specimens were characterized via rupture and thermal cycle testing and subsequently analyzed by SEM and EDS. Shown in FIG. 3 is a composite cross-sectional micrograph of a joint according to the present invention. The joint was well sealed, as determined by hermeticity testing conducted prior to metallographic analysis. The entire seal between the metal gasket and the metal part is approximately 1.1 mm thick, although it is expected that this can be readily reduced simply by altering the geometry of the DuraFoil stamping. On the ceramic side of the seal, the CuO—Ag braze forms a robust joint between the YSZ and the alumina scale of the DuraFoil. Note that the braze is thicker toward the center of the specimen. No reaction zone is observed at the YSZ/braze interface, however a 10-15 µm thick zone forms on the DuraFoil due to reaction between the $Al_2O_3$ scale and the CuO in the braze. The dominant product is the mixed oxide phase $2CuO.Al_2O_3$.

Figure 4:
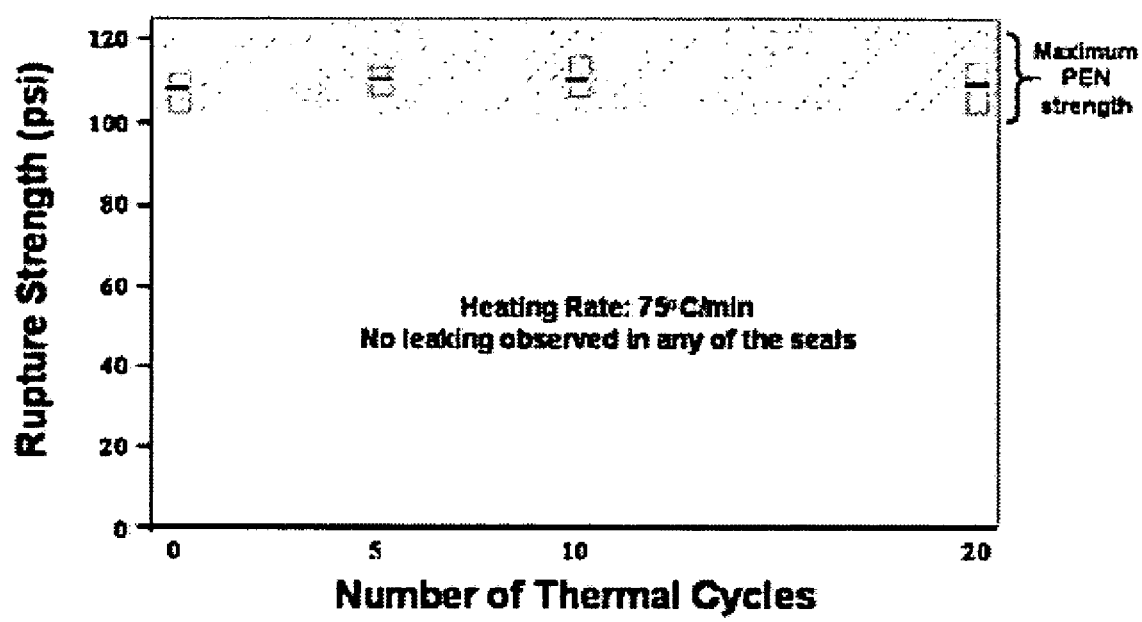
FIG. 4 is a graph showing the rupture strength of the joints fabricated in proof of principle experiments to demonstrate the present invention in the as-joined and as-cycled conditions.

Results from rupture testing are shown in FIG. 4. Each joint was found to be hermetic up to the maximum pressure (60 psi) tested during initial leak testing. More extensive pressure testing up to the point of rupture indicated no failure in any of the seals, even in the specimens that underwent as many as twenty rapid thermal cycles. As with the air brazed specimens above, failure occurred in the ceramic disc.

The invention claimed is:

1. A joint comprising:
   a. a metal part,
   b. a ceramic part,
   c. a thin film of glass,
   d. and a metal flexible gasket having greater flexibility than the metal part wherein
   e. the flexible gasket is attached to the metal part on one side and hermetically bonded to the ceramic part by the thin film of glass on the other side and configured to flex in response to changes in the size of the metal part and the ceramic part brought about by temperature changes while maintaining a hermetic seal between said flexible gasket and both said metal part and said ceramic part.

2. The joint of claim 1 wherein said bond between said ceramic part and said flexible gasket is formed of brazed silver copper oxide alloys in air.

3. The joint of claim 1 wherein said bond between said ceramic part and said flexible gasket is formed of a polymeric pre-ceramic precursor.

4. The joint of claim 1 wherein said ceramic is an electrolyte.

5. The joint of claim 4 wherein said electrolyte is yttria stabilized zirconia.

6. The joint of claim 1 wherein the joint is a part of a solid oxide fuel cell.

7. The joint of claim 1 wherein the joint is a part of a oxygen separator.

8. The joint of claim 1 wherein the joint is a part of a hydrogen separator.

9. The joint of claim 1 wherein said metal part is a high temperature stainless steel.

10. The joint of claim 9 wherein said stainless steel is an alumina forming stainless steel.

11. The joint of claim 9 wherein said stainless steel is chromia forming stainless steel.

12. The joint of claim 1 wherein said metal part is a superalloy.

13. The joint of claim 1 wherein said gasket is a high temperature stainless steel.

14. The joint of claim 13 wherein said stainless steel is an alumina forming stainless steel.

15. The joint of claim 13 wherein said stainless steel is chromia forming stainless steel.

16. The joint of claim 13 wherein said gasket is a superalloy.

* * * * *